(12) United States Patent  
Sahm, III

(10) Patent No.: US 8,297,229 B1
(45) Date of Patent: Oct. 30, 2012

(54) FEED CONTAINER WITH RETENTION SYSTEM

(75) Inventor: Victor A. Sahm, III, Dallas, TX (US)

(73) Assignee: Southwest Agri-Plastics, Inc., Addison, TX (US)

( * ) Notice: Subject to any disclaimer, the term of this patent is extended or adjusted under 35 U.S.C. 154(b) by 0 days.

(21) Appl. No.: 13/338,668

(22) Filed: Dec. 28, 2011

Related U.S. Application Data

(62) Division of application No. 12/698,666, filed on Feb. 2, 2010, now abandoned.

(51) Int. Cl.
*A01K 1/10* (2006.01)

(52) U.S. Cl. ........................ 119/61.54; 119/65

(58) Field of Classification Search ............... 119/61.54, 119/61.5, 65; D32/53
See application file for complete search history.

(56) References Cited

U.S. PATENT DOCUMENTS

| | | | |
|---|---|---|---|
| D4,837 S | 4/1871 | Bockee, Jr. | |
| D28,326 S | 3/1898 | Joy | |
| 1,809,006 A | 6/1931 | Wright, at al. | |
| D154,226 S | 4/1948 | Ackermann | |
| 3,035,623 A | 5/1962 | Goetz | |
| D199,594 S | 11/1964 | Rathaus | |
| 3,825,166 A | 7/1974 | Padovani | |
| 4,135,693 A * | 1/1979 | Miavitz | 248/339 |
| 4,204,501 A | 5/1980 | Karlsson et al. | |
| 4,286,546 A | 9/1981 | Moore | |
| 4,436,056 A | 3/1984 | MacLeod | |
| D296,948 S | 7/1988 | Fuller | |
| D337,181 S | 7/1993 | Warman | |
| D340,553 S | 10/1993 | Sahm, Jr. | |
| D353,914 S | 12/1994 | Sahm, Jr. | |
| 5,513,770 A | 5/1996 | Seeley et al. | |
| 5,738,037 A | 4/1998 | Mahan | |
| 5,791,287 A | 8/1998 | Gruber | |
| 7,124,603 B2 * | 10/2006 | Bianco | 62/457.3 |
| D545,519 S | 6/2007 | King | |
| 7,543,705 B2 | 6/2009 | Yourist | |
| 2004/0031802 A1 * | 2/2004 | Parodi | 220/669 |
| 2008/0022937 A1 | 1/2008 | Shirley et al. | |

* cited by examiner

*Primary Examiner* — Kimberly Berona
(74) *Attorney, Agent, or Firm* — Gardere Wynne Sewell, LLP

(57) ABSTRACT

A feed container for storing hardened livestock feed is disclosed. The feed container has a storage area defined by a bottom wall and a sidewall for retaining animal feed within the storage area when the feed is in a solid phase and the feed container is in a non-upward resting position or is on its sidewall. Also disclosed is a method for utilizing a feed container, having said storage area, for retaining animal feed within the storage area when the feed is in a solid phase and the feed container is in a non-upward resting position or is on its sidewall.

20 Claims, 3 Drawing Sheets

FEED CONTAINER WITH RETENTION SYSTEM

CROSS REFERENCE TO RELATED APPLICATION

This application claims the benefit of U.S. patent application Ser. No. 12/698,666 having a U.S. filing date of Feb. 2, 2010, the disclosure of which is hereby incorporated by reference in its entirety and to the maximum extent allowable by law.

BACKGROUND

When feeding livestock, large containers are oftentimes placed on the ground to enable the animals to eat therefrom. However, it is common for these containers to tip over if, for example, an animal or person accidentally kicks or steps onto the edge of the container. As a result, the feed product will empty from the container when the container is tipped or toppled, ultimately resting on the ground in dirt or mud. This is especially problematic in cold weather when feed material hardens inside the container, which increases the likelihood of the hardened feed in its entirety sliding out of the container. During the winter months, for example, molasses based products can harden into a solid block due to extreme cold temperatures. If the container is tipped over or is on its side, the hardened product as a solid will slide out of the container potentially damaging the molasses block and/or causing the block to become contaminated or covered in dirt, mud or other debris.

SUMMARY

A container is disclosed having a bottom wall and a sidewall forming a storage area for holding livestock feed. The container includes a retention system molded integral with and disposed an inner surface of the sidewall. The retention system extends into the storage area and is configured to retain a hardened or solid feed product disposed within the storage area, such as for example, hardened molasses. In particular, the molded retention system extends a member into the storage area and grips the feed material to resist a sliding outward movement of the feed material from the storage area when the container is in a non-upward resting position or is tipped or turned over on its side. The feed container may be plastic or may be metal or may be metal clad. The feed container may have a bottom wall that is circular. The extending member is generally semicircular in configuration in the storage area. The extending member generally extends around the entire circumference of the inner surface of the sidewall. The extending member may be from about one to about two inches from the bottom wall of the feed container. The extending member may have a small radius of about 0.124 inches or about 0.12 inches.

Still further, a method for utilizing a feed container is disclosed. The method includes having a feed container, with a storage area defined by a bottom wall and a sidewall, for retaining animal feed within the storage area when the feed is in a solid phase and the feed container is in a non-upward resting position. The method also comprises forming a member extending from the interior surface of the sidewall a limited distance into the storage area and at a distance from the bottom wall sufficient to retain the entirety of the animal feed within the storage area when the animal feed is in its solid phase and the feed container is in the non-upward resting position, and pouring the animal feed in its liquid phase to fill the storage area completely below the extending member and at a desired distance above the extending member, whereby, the extending member will retain all of the animal feed in its solid phase that is below the extending member and the remaining animal feed that is in its solid phase above the extending member when the feed container is in the non-upward resting position. The feed container may be plastic or may be metal or may be metal clad. The feed container may have a bottom wall that is circular. The extending member is generally semicircular in configuration in the storage area. The extending member generally extends around the entire circumference of the inner surface of the sidewall. The extending member may be from about one to about two inches from the bottom wall of the feed container. The extending member may have a small radius of about 0.124 inches or about 0.12 inches.

An additional method of utilizing a feed container is disclosed. The method includes having a feed container, with a storage area defined by a bottom wall and a sidewall, for retaining animal feed within the storage area when the feed is in a solid phase and the feed container is tipped on its sidewall. The method also comprises forming a member extending from the interior surface of the sidewall a limited distance into the storage area and at a distance from the bottom wall sufficient to retain the entirety of the animal feed within the storage area when the animal feed is in its solid phase and the feed container is tipped on its sidewall, and pouring the animal feed in its liquid phase to fill the storage area completely below the extending member and at a desired distance above the extending member, whereby, the extending member will retain all of the animal feed in its solid phase that is below the extending member and the remaining animal feed that is in its solid phase above the extending member when the feed container is tipped on its sidewall. The feed container may be plastic or may be metal or may be metal clad. The feed container may have a bottom wall that is circular. The extending member is generally semicircular in configuration in the storage area. The extending member generally extends around the entire circumference of the inner surface of the sidewall. The extending member may be from about one to about two inches from the bottom wall of the feed container. The extending member may have a small radius of about 0.124 inches or about 0.12 inches.

DETAILED DESCRIPTION

Figure 1:
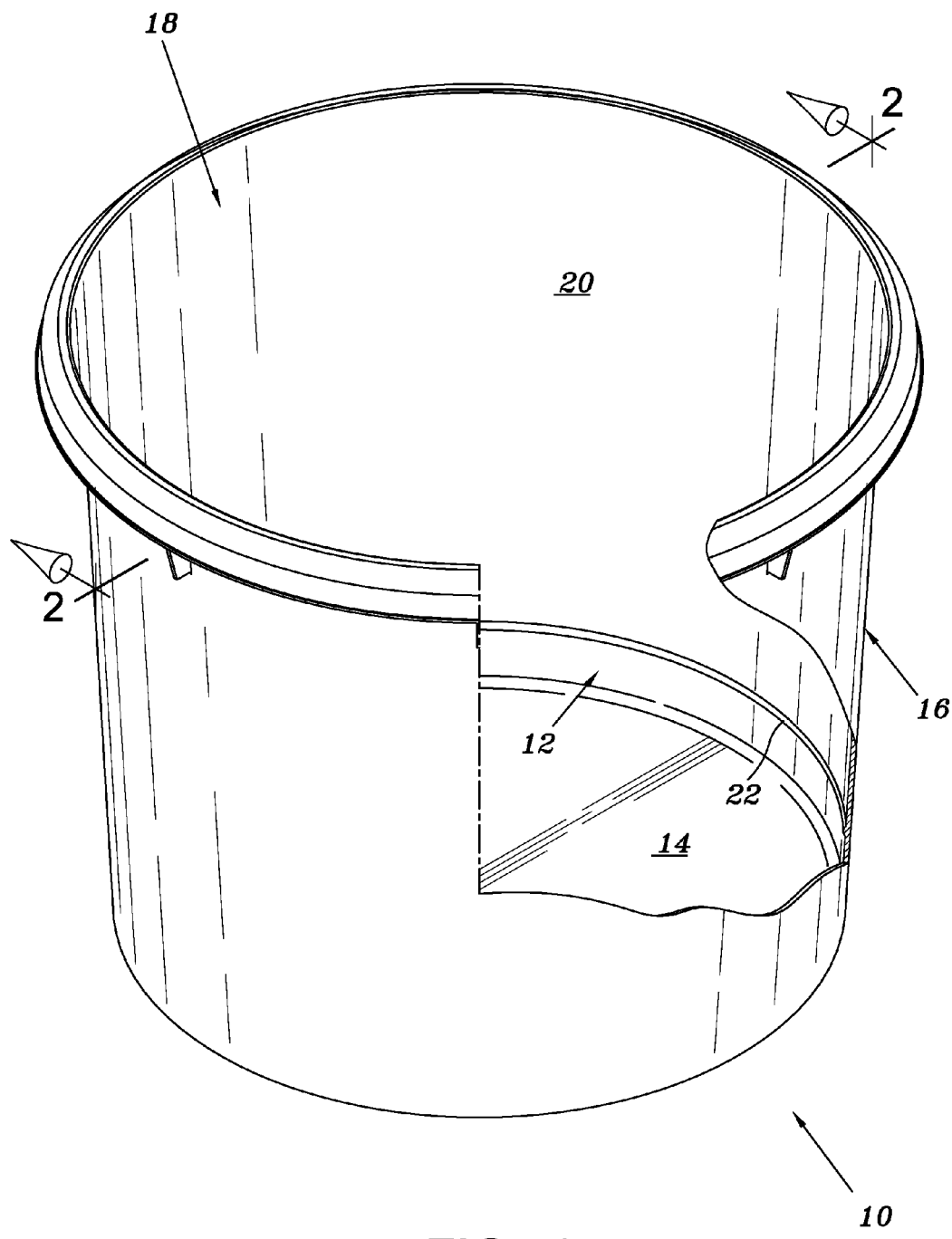
FIG. 1 is an illustration of a representative plastic feed container in which a retention system is employed to advantage.

In the description which follows, like parts are marked throughout the specification and drawings with the same reference numerals, respectively. The drawings are not necessarily to scale and certain features may be shown exaggerated in scale or in somewhat schematic form in the interest of clarity and conciseness.

FIGS. 1-5 are illustrative of a representative feed container 10 in which a retention system 12 is employed to advantage.

Figure 2:
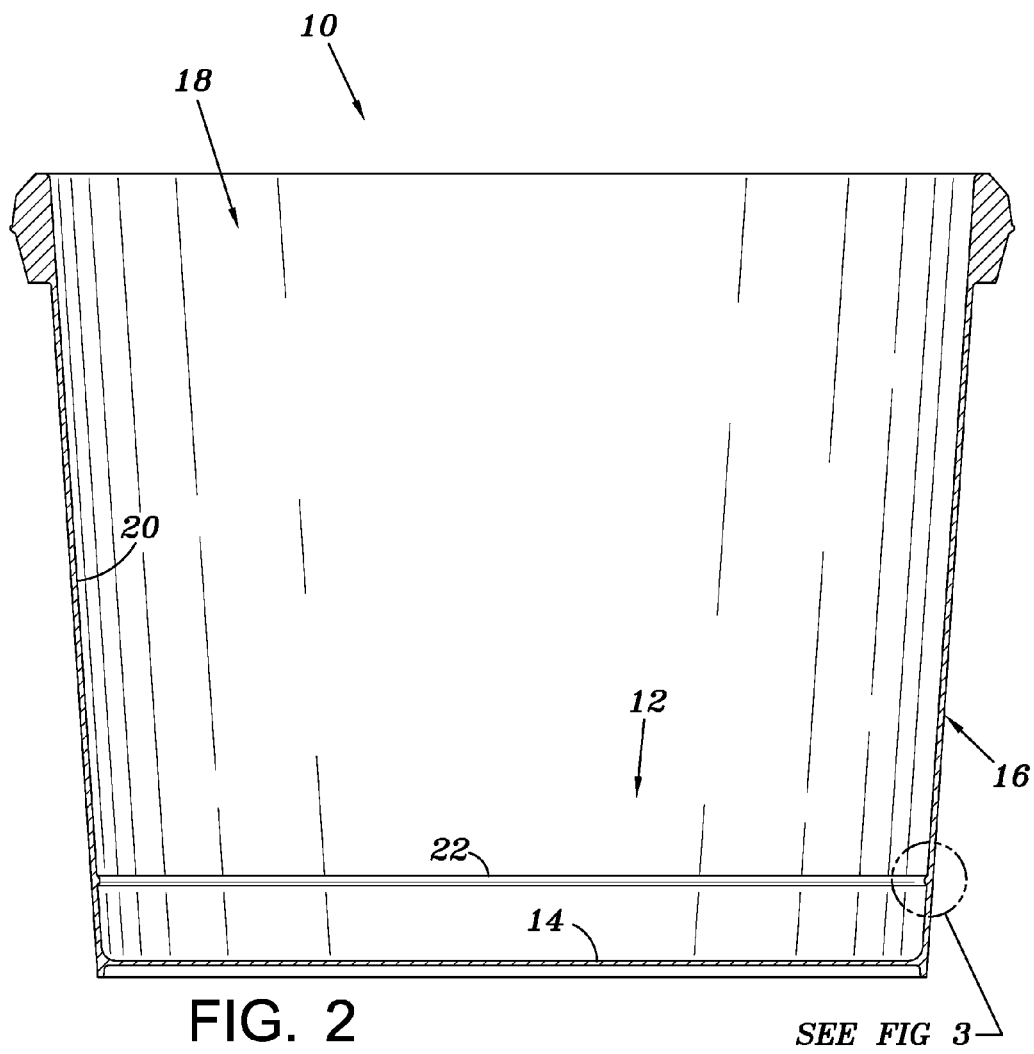
FIG. 2 is a section view of the container of FIG. 1 illustrating the retention system.
Figure 3:
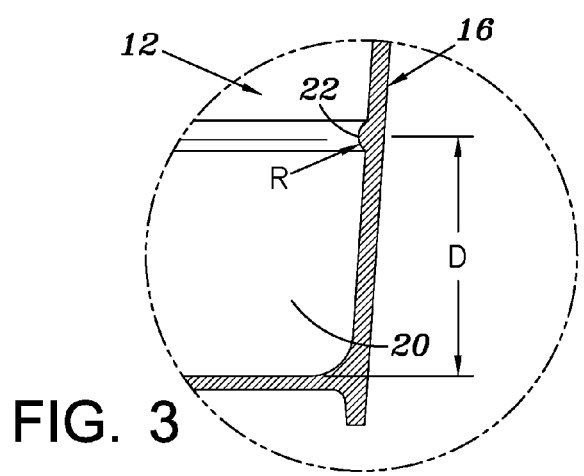
FIG. 3 is an enlarged view of a portion of the retention system illustrated in FIG. 2.

Retention system 12 is configured to retain and/or otherwise resist a hardened feed product 24 (FIG. 4) or one in a solid phase from sliding out of storage area 18 in the event that the container is tipped or on its sidewall or otherwise positioned in a non-upward resting position, as seen in FIGS. 1 and 2.

Container 10 includes a bottom wall 14 and a sidewall 16 forming storage area 18 for receiving feed product 24. As illustrated specifically in FIGS. 1 and 2, retention system 12 is disposed on an inner surface 20 of sidewall 16 and comprises an extension member 22 inwardly projecting from surface 20 at least partially into storage area 18. Extension 22 is preferably molded integral with sidewall 16 and comprises a generally semicircular cross-sectional area (best illustrated in FIGS. 2 and 3); however, it should be understood that extension 22 may be otherwise configured (e.g., oval, triangular, square, rectangular, etc.) and separately affixed to inner surface 20. By way of example, extension 22 has a radius "R" of approximately 0.124 inches and is disposed from bottom wall 14 a distance "D" between about 1 to 2 inches, and may be more specifically, 1.5 inches, with both values of "R" and "D" facilitating easy removal of container 10 from a mold core, as discussed in greater detail below. However, it should be understood that other values of "R" and "D" may be utilized.

Retention system 12 is advantageous to retain hardened livestock feed product within storage area 18 in the event container 10 is tipped or otherwise positioned in the non-upward resting position. For example, a molasses product initially in a more liquid phase will harden over time when disposed within storage area 18, especially in cold weather environments. In such instances, the hardened molasses block as a solid can slide outward from the protection of storage area 18 eventually resting on grass, dirt, mud and/or other debris. Extension 22 is configured such that when the feed product hardens into a block, extension 22 "grips" the hardened feed product to prevent and/or otherwise resist sliding movement of the block from storage area 18.

Figure 4:
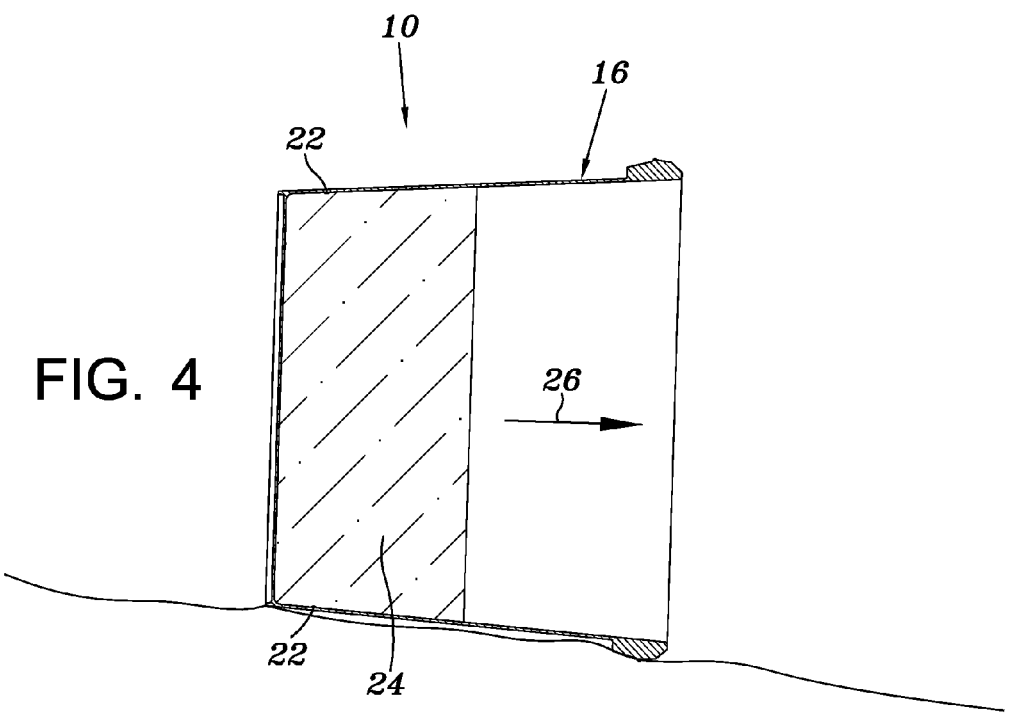
FIG. 4 is an illustration of the plastic feed container of FIG. 1 filled with hardened livestock feed.
Figure 5:
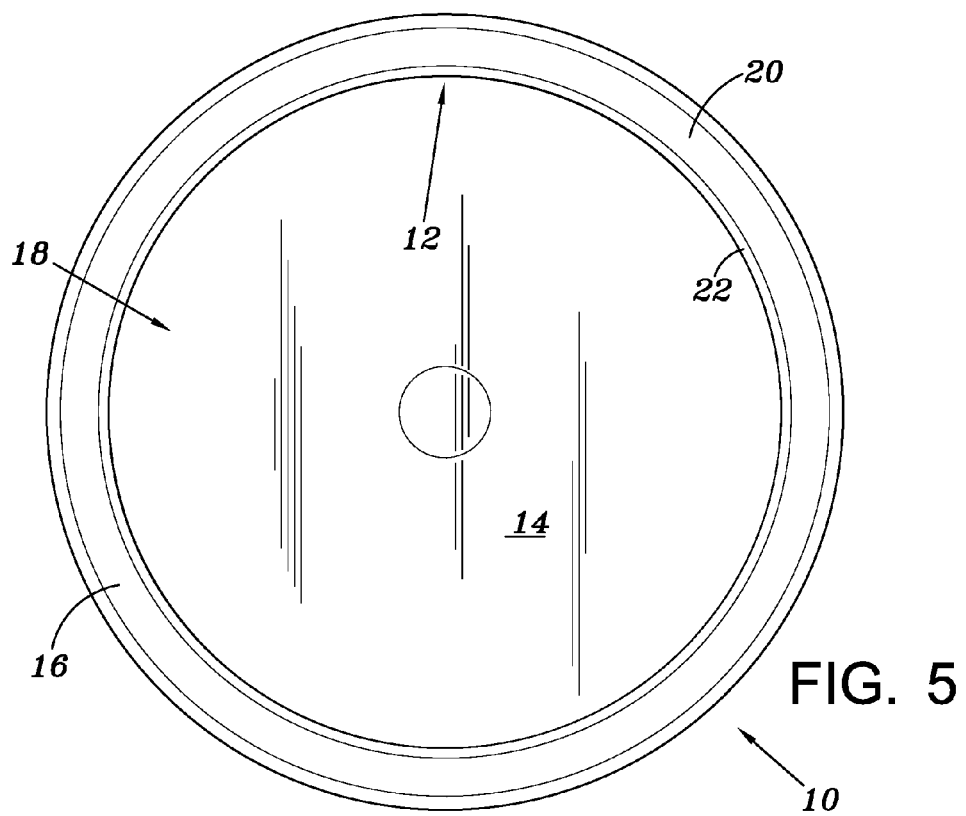
FIG. 5 is a top view of the plastic feed container of FIG. 1.

In use, the desired amount of liquid feeding product 24 is poured into storage area 18 and filled, generally to a level above extension 22. If the product solidifies, the feeding product 24 will conform around extension 22. Accordingly, when container 10 is in a position other than an upright position (e.g., tipped over or on its side as seen in FIG. 4), extension 22 grips feeding product 24 to prevent or substantially reduce the likelihood of feeding product 24 sliding outwardly from storage area 26 in the direction of arrow 26 (FIG. 4).

As disclosed, in use, the feed product may be allowed to or may harden, whereby when hardened, the retention system grips the hardened feed product to prevent the hardened feed from sliding within the container.

According to some embodiments, container 10 is a plastic molded container and is manufactured by providing a mold cavity and a mating core which define the shape of the feed container. A recessed area is cut into the mating core, which is used to form extension 22. During manufacture, plastic material is inserted between the mold cavity and mating core and the mold is closed and heated to a predetermined temperature to form the plastic into container 10. After applying the necessary heat, the mold cavity and mating core are then separated to facilitate the removal of feed container 10 from the mating core.

Although embodiments of a plastic or metal clad assembly 10 have been described in detail, those skilled in the art will also recognize that various substitutions and modifications may be made without departing from the scope and spirit of the appended claims.

What is claimed is:

1. A method for utilizing a feed container, having a storage area defined by a bottom wall and a sidewall, for retaining animal feed within the storage area when the feed is in a solid phase and the feed container is in a non-upward resting position, the method comprising:

forming a member extending from the interior surface of the sidewall a limited distance into the storage area and at a distance from the bottom wall sufficient to retain the entirety of the animal feed within the storage area when the animal feed is in its solid phase and the feed container is in the non-upward resting position, and pouring the animal feed in its liquid phase to fill the storage area completely below the extending member and at a desired distance above the extending member, whereby, the extending member will retain all of the animal feed in its solid phase that is below the extending member and the remaining animal feed that is in its solid phase above the extending member when the feed container is in the non-upward resting position.

2. The method of claim 1, wherein forming the extending member comprises forming the member extending from the interior surface of the sidewall with a radius of about 0.12 inches or about 0.124 inches.

3. The method of claim 1, wherein forming the extending member comprises providing the member extending around a circumference of the feed container.

4. The method of claim 1, wherein the feed container is plastic.

5. The method of claim 1, wherein the feed container is metal.

6. The method of claim 1, wherein the feed container is metal clad.

7. The method of claim 1, wherein the bottom wall is circular.

8. The method of claim 1, wherein forming includes molding in a mold.

9. The method of claim 1, wherein forming includes forming the member with a semicircular configuration.

10. The method of claim 1, wherein forming includes forming the member about one to about two inches from the bottom wall of the feed container.

11. A method for utilizing a feed container, having a storage area defined by a bottom wall and a sidewall, for retaining animal feed within the storage area when the feed is in a solid phase and the feed container is on its sidewall, the method comprising:

forming a member extending from the interior surface of the sidewall a limited distance into the storage area and at a distance from the bottom wall sufficient to retain the entirety of the animal feed within the storage area when the animal feed is in its solid phase and the feed container is in on its sidewall, and pouring the animal feed in its liquid phase to fill the storage area completely below the extending member and at a desired distance above the extending member, whereby, the extending member will retain all of the animal feed in its solid phase that is below the extending member and the remaining animal feed that is in its solid phase above the extending member when the feed container is on its sidewall.

12. The method of claim 11, wherein forming the extending member comprises forming the member extending from the interior surface of the sidewall with a radius of about 0.12 inches or about 0.124 inches.

13. The method of claim 11, wherein forming the extending member comprises providing the member extending around a circumference of the feed container.

14. The method of claim 11, wherein the feed container is plastic.

15. The method of claim 11, wherein the feed container is metal.

16. The method of claim 11, wherein the feed container is metal clad.

17. The method of claim 11, wherein the bottom wall is circular.

18. The method of claim 11, wherein forming includes molding in a mold.

19. The method of claim 11, wherein forming includes forming the member with a semicircular configuration.

20. The method of claim 11, wherein forming includes forming the member about one to about two inches from the bottom wall of the feed container.

\* \* \* \* \*